US012243393B2

(12) United States Patent
Casey et al.

(10) Patent No.: US 12,243,393 B2
(45) **Date of Patent: *Mar. 4, 2025**

(54) ENHANCED ELECTRONIC GAMING MACHINES PROVIDING SELECTIVELY VOLATILE WAGER OUTCOMES

(71) Applicant: Aristocrat Technologies Australia Pty Limited, North Ryde (AU)

(72) Inventors: Michael P. Casey, Reno, NV (US); David Michael Smith, Gardnerville, NV (US); Jose Antonio Uberuaga, Reno, NV (US); Joshua Wade Davis, Barboursville, VA (US); Kelton F. Flinn, Charlottesville, VA (US); Zhao Ming Fei, Brentwood, TN (US); Kenner Scott Warren, Nolensville, TN (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,655

(22) Filed: Nov. 8, 2022

(65) Prior Publication Data

US 2023/0064545 A1 Mar. 2, 2023

Related U.S. Application Data

(63) Continuation of application No. 17/065,160, filed on Oct. 7, 2020, now Pat. No. 11,514,757, which is a (Continued)

(51) Int. Cl.
*G07F 17/32* (2006.01)

(52) U.S. Cl.
CPC ...... *G07F 17/3276* (2013.01); *G07F 17/3213* (2013.01); *G07F 17/323* (2013.01); (Continued)

(58) Field of Classification Search
CPC ............ G07F 17/3244; G07F 17/3267; G07F 17/323; G07F 17/3262; G07F 17/326
See application file for complete search history.

(56) References Cited

U.S. PATENT DOCUMENTS 5,275,400 A 1/1994 Weingardt
6,142,872 A * 11/2000 Walker ................ G07F 17/3239 463/16

(Continued)

OTHER PUBLICATIONS

Notice of Allowance dated Jun. 25, 2020 for U.S. Appl. No. 15/936,115 (pp. 1-11).

(Continued)

*Primary Examiner* — William H McCulloch, Jr.
(74) *Attorney, Agent, or Firm* — Weaver Austin Villeneuve & Sampson LLP

(57) ABSTRACT

A bingo gaming system, machine, and method include a main bingo game, a feature bingo game, a main reel game associated with the main bingo game, and a feature reel game associated with the feature bingo game. The main reel game simulates outcomes of the main bingo game. The feature reel game simulates outcomes of the feature bingo game. A feature bingo game may be triggered by a main bingo game outcome. Before the feature bingo game begins, a player may be given an opportunity to select a volatility option for the feature bingo game. The volatility selection may impact the probability of winning the feature bingo game (and/or feature reel game), as well as the reward(s) associated with winning the feature bingo game (and/or feature reel game).

20 Claims, 12 Drawing Sheets

Related U.S. Application Data continuation of application No. 15/936,115, filed on Mar. 26, 2018, now Pat. No. 10,810,840.

(52) U.S. Cl.
CPC ...... *G07F 17/3262* (2013.01); *G07F 17/3288* (2013.01); *G07F 17/3216* (2013.01); *G07F 17/3239* (2013.01); *G07F 17/3246* (2013.01); *G07F 17/3248* (2013.01); *G07F 17/3258* (2013.01)

(56) References Cited

U.S. PATENT DOCUMENTS

| | | | | |
|---|---|---|---|---|
| 6,146,271 | A | 11/2000 | Kadlic | |
| 6,244,958 | B1 | 6/2001 | Acres | |
| 7,291,068 | B2 | 11/2007 | Bryant | |
| 7,819,742 | B2 | 10/2010 | Chamberlain | |
| 7,892,084 | B2 | 2/2011 | Yarbrough | |
| 7,938,720 | B2 | 5/2011 | Watkins | |
| 8,562,414 | B2 | 10/2013 | Yarbrough | |
| 8,579,695 | B1 | 11/2013 | Torres | |
| 9,691,227 | B2 | 6/2017 | Yarbrough | |
| 9,852,579 | B2 | 12/2017 | Caputo | |
| 10,810,840 | B2 * | 10/2020 | Casey | G07F 17/3262 |
| 11,183,018 | B2 | 11/2021 | Marks | |
| 11,514,757 | B2 * | 11/2022 | Casey | G07F 17/3262 |
| 2001/0031659 | A1 | 10/2001 | Perrie | |
| 2002/0043759 | A1 | 4/2002 | Vancura | |
| 2002/0045474 | A1 | 4/2002 | Singer | |
| 2002/0132661 | A1 | 9/2002 | Lind | |
| 2004/0152508 | A1 | 8/2004 | Lind | |
| 2007/0060290 | A1 | 3/2007 | Watkins | |
| 2007/0155472 | A1 | 7/2007 | Gail | |
| 2011/0009179 | A1 | 1/2011 | Tomei | |
| 2011/0045889 | A1 | 2/2011 | Khal | |
| 2013/0053132 | A1 | 2/2013 | Schueller | |
| 2013/0130766 | A1 | 5/2013 | Harris | |
| 2014/0004923 | A1 | 1/2014 | Lind | |
| 2014/0256402 | A1 | 9/2014 | Caputo | |
| 2016/0093151 | A1 | 3/2016 | Hawkins | |
| 2016/0093153 | A1 | 3/2016 | Hawkins | |
| 2017/0004672 | A1 | 1/2017 | Coleman | |
| 2017/0024973 | A1 | 1/2017 | Montenegro | |
| 2017/0109963 | A1 | 4/2017 | Caputo | |
| 2017/0113127 | A1 | 4/2017 | Hoover | |
| 2017/0316646 | A1 | 11/2017 | Hawkins | |
| 2019/0244480 | A1 | 8/2019 | Marsh | |
| 2019/0295380 | A1 | 9/2019 | Casey | |
| 2020/0051391 | A1 | 2/2020 | Sevigny | |
| 2021/0019998 | A1 * | 1/2021 | Casey | G07F 17/3276 |
| 2021/0335096 | A1 | 10/2021 | Meyer | |
| 2021/0390826 | A1 | 12/2021 | Santisi | |
| 2023/0064545 | A1 * | 3/2023 | Casey | G07F 17/3288 |

OTHER PUBLICATIONS

Office Action (Non-Final Rejection) dated Sep. 10, 2021 for U.S. Appl. No. 17/065,160 (pp. 1-12).
Office Action (Final Rejection) dated Dec. 29, 2021 for U.S. Appl. No. 17/065,160 (pp. 1-13).
Office Action (Non-Final Rejection) dated May 24, 2022 for U.S. Appl. No. 17/065,160 (pp. 1-14).
Office Action (Notice of Allowance and Fees Due (PTOL-85) dated Sep. 14, 2022 for U.S. Appl. No. 17/065,160 (pp. 1-6).
Australian Examination Report No. 1 issued in App. No. AU2023242247, dated Aug. 8, 2024, 5 pages.

* cited by examiner

430

FIG. 6
400
410
414
418
416
420
GRAND
$8,880.06
MAJOR
$880.41
MINOR
$50.96
MINI
$21.31
CREDIT
12718
BET
68
WIN
361
25
Free Games
12
Added
15
Free Games
24
Added
Mystery Choice
10
Free Games
36
Added
Free Games
48
Added
Touch to choose your Feature.
1¢
602c
602b
602a

FIG. 7
400
410
414
412
410
512
418
416
420
GRAND
$8,880.06
MAJOR
$880.41
MINOR
$50.96
MINI
$21.31
CREDIT
12718
BET
68
WIN
361
25
Free
Games
12
Added
15
Free
Games
24
Added
Mystery
Choice
10
Free
Games
36
Added
6
Free
Games
48
Added
1¢
602c
602b
602a

FIG. 8
400
410
414
412
410
512
418
416
420
604
GRAND
$8,880.06
MAJOR
$880.41
MINOR
$50.96
MINI
$21.31
CREDIT
12718
BET
68
WIN
489
EXTRA WAYS
EXTRA WAYS
1¢

ENHANCED ELECTRONIC GAMING MACHINES PROVIDING SELECTIVELY VOLATILE WAGER OUTCOMES

RELATED APPLICATIONS

This application is a continuation of U.S. patent application Ser. No. 17/065,160, filed Oct. 7, 2020, which is a continuation of U.S. patent application Ser. No. 15/936,115, filed Mar. 26, 2018, the disclosures of which are incorporated herein by reference in their entirety.

TECHNICAL FIELD

The present disclosure generally relates to gaming and wagering, and, more particularly, to electronic gaming machines that permit wagering upon outcomes of bingo games.

BACKGROUND

Electronic gaming machines and/or electronic gaming devices provide a variety of wagering games such as slot games, video poker games, video blackjack games, roulette games, video bingo games, keno games and other types of games that are frequently offered at casinos and other locations. Gameplay may involve a player establishing a credit balance by inputting money, or another form of monetary credit, and placing a monetary wager (from the credit balance) on one or more outcomes of an instance (or single play) of a primary game. Awards from any winning outcomes may be added back to the credit balance, which may be provided to the player in a monetary or other form upon completion of a gaming session and/or when the player wants to "cash out."

Slot or reel type games may be played on electronic gaming machines. The slot or reel games may be displayed to the player in the form of various symbols arrayed in a row-by-column grid or matrix. Specific combinations of symbols may be associated with a winning outcome and/or reward. Winning combinations and/or their corresponding awards may be shown in a "pay-table" which may be available to the player for reference (e.g., displayed on, by, and/or near the gaming machine).

Bingo games may also be played on electronic gaming machines. In some bingo games, a player receives a bingo card in response to a bingo game wager. A server, possibly after determining that enough players have entered the bingo game, may randomly determine and/or select a set of bingo numbers, and distribute the bingo numbers to the electronic gaming machines in the bingo game. The appropriate cells on the bingo card may be marked (or "daubed") based on the bingo numbers.

In some examples, the electronic gaming machines may use a random number generator (RNG) to randomly generate elements of the games (e.g. bingo cards, bingo numbers, slot symbol combinations) and/or the outcomes of the games. The games may be designed to return a certain percentage of the amount wagered back to the player (RTP=return to player) over the course of many plays or instances of the game. The RTP and/or randomness of the RNG bear on the fairness of the games and may therefore be highly regulated.

SUMMARY

Systems and methods are provided for selectively volatile feature games, substantially as shown in and/or described in connection with at least one of the figures, as set forth more completely in the claims.

Some examples of the present disclosure may be related to an apparatus for providing selectively volatile wager outcomes, comprising a credit input configured to receive a credit item and increase a credit balance based on the monetary value of the credit item, a credit output configured to provide a payout associated with the credit balance, a user interface configured to receive a user input, a display, and a game controller. The game controller may be configured to decrease the credit balance based on a wager, display a main bingo card, a list of bingo numbers, and a main bingo game outcome in response to the wager, simulate a spinning reel game on the display based on the main bingo game outcome, receive a selected volatility option from among a plurality of displayed volatility options, receive a feature bingo card and a feature bingo game outcome, simulate a feature spinning reel game on the display based on the feature bingo game outcome, and increase the credit balance based on a feature bingo game reward. The spinning reel game may have a main reel game outcome. The feature bingo game outcome may be based, at least in part, on the feature bingo card, the selected volatility option, and the list of bingo numbers, and the feature bingo game outcome may be associated with the feature bingo game reward. The feature spinning reel game may be associated with a feature reel game outcome, and the feature reel game outcome may be associated with the feature bingo game reward.

Some examples of the present disclosure may be related to a method of providing selectively volatile wager outcomes, comprising displaying, on a display screen, and in response to a wager, a main bingo game comprising a main bingo card and a list of bingo numbers, determining a main bingo game outcome based at least in part on the main bingo card and the list of bingo numbers, animating, on the display screen, a spinning reel game, prompting selection of a volatility option from among of a plurality of volatility options in response to the feature bingo game award, receiving a selected volatility option, displaying a feature bingo card, determining a feature bingo game outcome, animating, on the display screen, a feature spinning reel game, where the feature spinning reel game has a feature reel game outcome associated with the feature bingo game outcome, and increasing a credit balance based on a feature bingo game reward. The spinning reel game may have a reel game outcome associated with the main bingo game outcome, and the reel game outcome may be associated with a feature bingo game award. The plurality of volatility options may be displayed on the display screen. The feature bingo game outcome may be based, at least in part, on the feature bingo card, the list of bingo numbers, and a feature bingo game pay table. The feature bingo game pay table may be based, at least in part, on the selected volatility option. The feature bingo game outcome may be associated with the feature bingo game reward.

Some examples of the present disclosure may be related to a system for providing selectively volatile wager outcomes, comprising a gaming server configured to generate a list of bingo numbers and transmit a main bingo card and a feature bingo card, and a gaming device in communication with the gaming server. The gaming device may comprise a credit input configured to receive a credit item and increase a credit balance based on the monetary value of the credit item, a credit output configured to provide a payout associated with the credit balance, a user interface configured to receive a user input, a display, and a game controller. The game controller may be configured to decrease the credit balance based on a wager, display the main bingo card, a list of bingo numbers, and a main bingo game outcome in response to the wager, simulate a spinning reel game on the display based on the main bingo game outcome, receive a selected volatility option from among a plurality of displayed volatility options, receive a feature bingo card and a feature bingo game outcome, simulate a feature spinning reel game on the display based on the feature bingo game outcome, and increase the credit balance based on a feature bingo game reward. The spinning reel game may have a main reel game outcome. The feature bingo game outcome may be based, at least in part, on the feature bingo card, the selected volatility option, and the list of bingo numbers. The feature bingo game outcome may be associated with the feature bingo game reward. The feature spinning reel game may be associated with a feature reel game outcome, and the feature reel game outcome may be associated with the feature bingo game reward.

These and other advantages, aspects and novel features of the present disclosure, as well as details of an illustrated example thereof, will be more fully understood from the following description and drawings.

DRAWING DESCRIPTIONS

Examples of the disclosure will now be described with reference to the accompanying drawings in which.

The figures are not necessarily to scale. Various dimensions may be exaggerated for illustrative clarity. Where appropriate, similar or identical reference numerals are used to refer to similar or identical components.

DESCRIPTION

Figure 1:
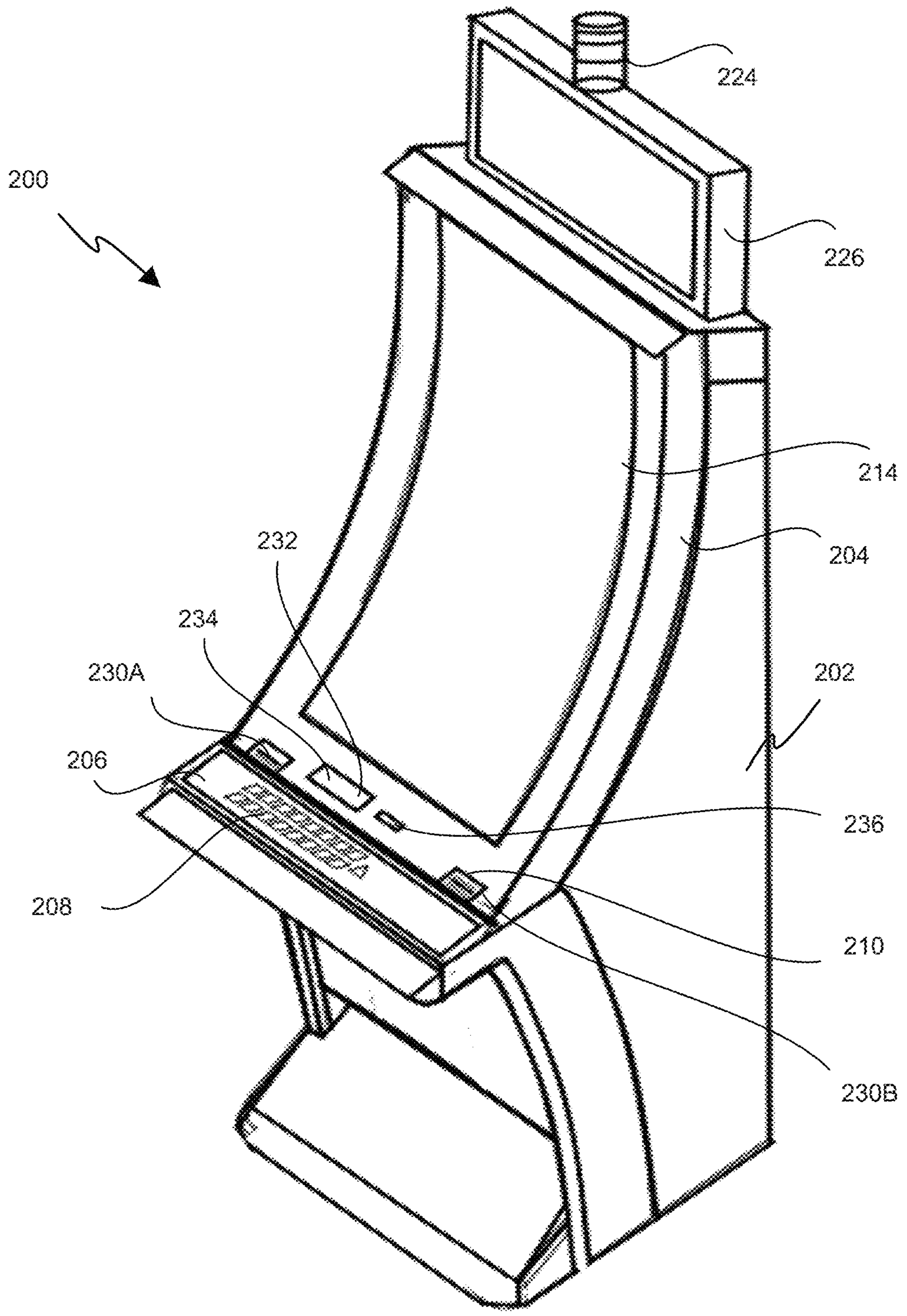
FIG. 1 is a perspective view of an example gaming machine.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

Various examples of the present disclosure are directed to gaming systems and/or gaming machines/devices that simulate bingo game outcomes as spinning reel (and/or slot) game outcomes. In some examples, the gaming systems and/or gaming machines/devices may display a bingo game outcome to a player via a spinning reel game outcome.

A main bingo game may be a networked game (e.g., via Ethernet), in which two or more gaming machines (and/or players) participate in the same bingo game. One or more networked gaming servers may be in communication with the participating gaming machines. Each gaming machine may receive a main bingo card and a list (and/or set) of bingo numbers from the one or more networked gaming servers. The main bingo card may be received in response to one or more bingo game wagers. In some examples, more than one main bingo card (e.g. 2, 3, 4, 5, etc. bingo cards) may be received in response to a single bingo game wager.

Before, after, or at the same time as receiving the main bingo card(s), the gaming machine may receive the list of bingo numbers. In an exemplary example, the list of bingo numbers may simulate a bingo ball draw, and may range from one to seventy five numbers. In some examples, the list may comprise more or less than seventy-five numbers. The list of bingo numbers may be continually generated until an upper limit (e.g., 75 numbers) is reached. The list of bingo numbers may be generated independent of any single wager, so long as the upper limit has not been reached, a sufficient number of players are participating in the main bingo game, and no game ending win has been achieved. The bingo numbers may be received successively (i.e., one after another, with some time in between), or all at once.

The bingo numbers may be compared to the numbers in the cells of the main bingo card(s) to identify matching numbers. In some examples, the matching numbers may be visually distinguished from non-matching numbers in the main bingo card(s) and/or the number listing by a different color, highlighting, or any suitable visual distinction. New main bingo cards may be generated in response to new bingo game wagers. New bingo numbers may be generated in response to game ending wins, as discussed below.

One or more main bingo game outcomes may be determined by the gaming machines (and/or one or more networked gaming servers) based on comparisons between the list of bingo numbers and the numbered cells of the main bingo card. The gaming machines (and/or gaming servers) may determine if a main bingo card contains any winning bingo combinations/patterns based on comparisons between the list of bingo numbers and the numbered cells of the main bingo card. A winning bingo combination/pattern may comprise a particular predefined combination/pattern of bingo card cells having numbers that match numbers in the bingo list of numbers and within a predefined quantity of numbers called (e.g. within the first 10, 20, 30, 40, etc. numbers called). Each main bingo game may have one or more game ending winning bingo patterns and/or one or more interim winning bingo patterns. A game ending winning bingo pattern may comprise a particular bingo pattern associated with a game ending main bingo game winning outcome (e.g. all cells of the main bingo card having numbers that match numbers in the bingo list of numbers). A game ending winning bingo pattern/outcome may end the main bingo game. An interim winning bingo pattern may comprise one or more other interim winning bingo patterns associated with one or more interim main bingo game winning outcomes. Interim winning bingo patterns and/or interim main bingo game winning outcomes may occur during the main bingo game without ending the main bingo game. A new listing of bingo numbers may be generated after a game ending main bingo game winning outcome occurs, thereby initiating another (new) main bingo game.

In some examples, interim winning bingo patterns may include traditional bingo patterns such as, for example, a completed horizontal cell row of the bingo card, a completed vertical cell column of the bingo card, a completed diagonal cell row of the bingo card, four cell corners of the bingo card, and/or all the cells of the bingo card. In an exemplary example, interim winning bingo patterns may comprise less traditional patterns, such as, for example, a seemingly randomly generated subset of cells disposed in no easily discernable arrangement. A winning main bingo game outcome may be determined if there are one or more interim and/or game ending winning bingo combinations/patterns on the main bingo card. Different winning patterns may be associated with different rewards of the winning main bingo game outcome. In some examples, the reward for a winning main bingo game outcome may be based on an amount wagered (e.g., bingo game wager), an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. Rewards associated with main bingo game winning outcomes (and/or winning bingo patterns/combinations) may be outlined in an associated main bingo game pay table. The main bingo game outcome may be a losing outcome for a player if that player does not achieve any winning bingo patterns/combinations.

The one or more main bingo game outcomes may be simulated in a spinning reel game façade with one or more reel game outcomes. The winning or losing main bingo game outcomes may be presented to the players via the spinning reel game, which may simulate one or more reel game outcomes equal to the appropriate main bingo game outcome. For example, if the main bingo game outcome for a particular gaming machine is a losing outcome, the reel game for that gaming machine may simulate one or more similarly losing reel game outcomes. If the main bingo game outcome for a particular gaming machine is a winning outcome, the reel game for that gaming machine may simulate one or more reel game winning outcomes. In exemplary examples, the reward for the one or more simulated winning reel game outcomes will be less than or equal to the reward for the main bingo game outcome for a particular gaming machine. In some examples, the available reel simulations may not provide for all possible main bingo game winning outcomes, so a main reel game outcome may be shown with a lesser reward. In such an example, the player may still receive the full reward for the main bingo game winning outcome, with the reward being presented as a combination of a credit reward for the displayed main reel game outcome, plus "poof" credits. In some examples, "poof" credits may comprise a credit reward that is not associated with a reel simulation. For example, if a player received a main bingo game winning outcome associated with a 17 credit reward, the player might receive a main reel game winning outcome associated with a 15 credit reward, and an additional 2 "poof" credits may also be added to the player's credit meter.

In some examples, the gaming device may simulate the spinning reel game by spinning each reel and then stopping each reel in a particular position to obtain a matrix of symbols. One or more combinations of symbols in the matrix of symbols may be associated with a reel game outcome that is equal to the main bingo game outcome. If the main bingo game outcome is a winning outcome, then the gaming device may spin the reels to obtain a matrix of symbols having one or more combinations of symbols associated with a reel game winning outcome. If the main bingo game outcome is a losing outcome, then the gaming device may spin the reels to obtain a matrix of symbols that is associated with a reel game losing outcome (e.g., having no combinations of symbols associated with a reel game winning outcome). If the symbol matrix has one or more combinations of symbols associated with a reel game winning outcome, those symbols may be highlighted, emphasized, and/or otherwise indicated. If the player obtains a main bingo game winning outcome, the gaming device may provide the main bingo game reward (and/or award, payout, prize, etc.) in the form of a spinning reel game reward that corresponds to the winning symbol combination(s) presented in the spinning reel game. In some examples, rewards for each winning symbol combination may be set forth in an associated reel game pay table. If the player obtains a losing bingo outcome, then the reel game outcome will be a losing outcome, and no winning reel game symbol combinations will be presented in the reel game symbol matrix.

In some examples, special symbols may be added to the matrix of symbols of the spinning reel game. In some examples, the special symbols may comprise one or more feature symbols, such as coins, for example. In some examples, the special symbols may comprise one or more wild (and/or wild card) symbols. In various examples, the awarded special symbols may or may not contribute to a winning combination of symbols. In some examples, whether and/or what special symbols are added to the spinning reel game may be based on the outcome of the main bingo game, and/or any main bingo game winning patterns. In some examples, the main bingo game pay table may include one or more special symbol flags associated with one or more main bingo game winning patterns to indicate whether (and/or which) special symbols should be added to the spinning reel game simulation.

In some examples, one or more of the participating gaming machines may provide a second (e.g., feature) bingo game to a player. For example, the feature bingo game may be part of (or all of) the main bingo game reward (and/or corresponding simulated reel game reward) for a particular gaming machine. In exemplary examples, the main bingo game pay table may include one or more feature game flags associated with one or more main bingo game winning patterns to indicate whether a feature game should be included as part of the reward. In exemplary examples, the feature bingo game is presented to a player as a reward for a reel game symbol matrix having a certain number of special feature symbols. For example, the player may obtain a winning bingo outcome with a winning bingo pattern that is associated with a credit reward and a feature game flag in the main bingo pay table. The winning bingo outcome may be subsequently presented in the reel game simulation as a reel game symbol matrix having a certain number of feature symbols (e.g., three or more coin symbols) that correspond to a feature game reward, as well as one or more symbol combinations that correspond to the bingo game credit reward.

The feature bingo game may be partially associated with the main bingo game. For example, the feature bingo game may include a feature bingo game card, but may use the main bingo game number list. The feature bingo card may have a grid of numbered cells that are different from the grid of numbered cells on the main bingo card. In some examples, the feature bingo game may use the original main bingo game card and a different (i.e., second) set of bingo game numbers. The feature bingo game may be associated with a feature pay table that is different from the main pay table associated with the main bingo game. Thus, bingo patterns that might result in a main bingo game winning outcome may result in a feature bingo game losing outcome, and/or vice versa. Further, the rewards for winning outcomes in the feature bingo game may be different than in the main bingo game.

As with the main bingo game, one or more feature bingo game outcomes may be determined by the gaming machines (and/or one or more networked gaming servers). The one or more feature bingo game outcomes may be based on comparisons between the list of bingo numbers and the numbered cells of the feature bingo card. The one or more feature bingo game outcomes may be simulated in a feature reel game façade with one or more feature reel game outcomes. In exemplary examples, the cumulative rewards for the one or more feature reel game outcomes on a particular gaming machine will be less than or equal to the reward for the feature bingo game outcome for that particular gaming machine. In some examples, the available reel simulations may not provide for all possible feature bingo game winning outcomes, so a feature reel game outcome may be shown with a lesser reward. In such an example, the player may still receive the full reward for the feature bingo game winning outcome, with the reward being presented as a combination of a credit reward for the displayed feature reel game outcome, plus 'poof' credits.

In some examples, a gaming machine may prompt a player to make a selection (e.g. a volatility selection) before proceeding with the feature bingo game. The selection may be related to several volatility options for the feature bingo game and/or feature reel games. For example, the player may be prompted to select between several different combinations of free spins and/or wild symbols, which may be implemented during the associated feature reel game simulation. The volatility options may range from a few free spins with a large number of wild symbols to a large number of free spins with few wild symbols. A feature bingo game pay table may be dynamically generated using the selected volatility option, or it may be chosen from a set of predetermined feature bingo game pay tables, in accordance with the selected volatility option. After a feature bingo game outcome is determined using the feature bingo game pay table, the gaming machine may simulate the feature bingo game outcome through a feature reel game. The feature reel game may apply a number of free spins and/or wild symbols corresponding to the selected volatility option. The feature reel game may produce a number of reel game outcomes equal to the selected number of free spins (e.g. one outcome for each free spin). The selected number of wild symbols may equal the number of wild symbols displayed in the spinning reels during the feature reel game simulation.

In exemplary examples, the total reward for all of the feature reel game outcomes accumulated during the free spins may be less than or equal to the reward for the feature bingo game. As with the main bingo game, rewards for a winning feature bingo game outcome may be based on an amount initially wagered (e.g., bingo game wager), a probability (and/or likelihood) of achieving a particular bingo pattern/combination, an associated feature bingo game paytable, an associated set of rules for the feature bingo game, an amount of bingo numbers needed to achieve the particular bingo pattern/combination, and/or other considerations. Rewards associated with feature bingo game winning outcomes (and/or winning bingo patterns/combinations) may be outlined in the feature bingo game pay table. The feature bingo game pay table may be different from the main bingo game pay table, and/or may be dynamically generated based on the player's volatility selection (i.e., selected number of free spins and/or wild card symbols).

Rewards may include a credit payout associated with a monetary value. A credit tally may be updated based on the credit payout. In some examples, the reward may come in the form of a payout that increases a credit balance and/or credit meter of the player on the gaming machine.

While volatility options have been presented in prior conventional random number-based spinning reel electronic gaming machines (i.e., class III gaming machines), it has been a challenge to implement volatility options with real consequences in electronic gaming machines that present bingo game outcomes through simulated spinning reel game facades (i.e., class II gaming machines). The present disclosure addresses this challenge by providing a feature bingo game with a feature bingo game card that is evaluated against the main bingo game number list, using a feature bingo game pay table associated with the feature bingo game based on the player selected volatility option. Thus, the selected volatility impacts not only the simulated feature reel game facade, but also the actual probability of winning a reward (and/or a reward amount) in the feature bingo game (that is subsequently simulated in the feature reel game facade). The inclusion of the feature bingo game provides a context in which the volatility options may be implemented.

Various advantages and features of the present disclosure will become apparent and more clearly understood in view of the detailed description, appended claims, drawings of the present disclosure. In the following description, reference is made to drawings which show by way of illustration various disclosed examples that incorporate various examples of the present disclosure. These examples are described in sufficient detail to enable those skilled in the art to make or use the disclosed examples. Other examples may be utilized and other structural, logical, software, hardware, and electrical changes may be made without departing from the scope of the appended claims. The following description is, therefore, not to be taken in a limited sense.

Gaming Device

Figure 2:
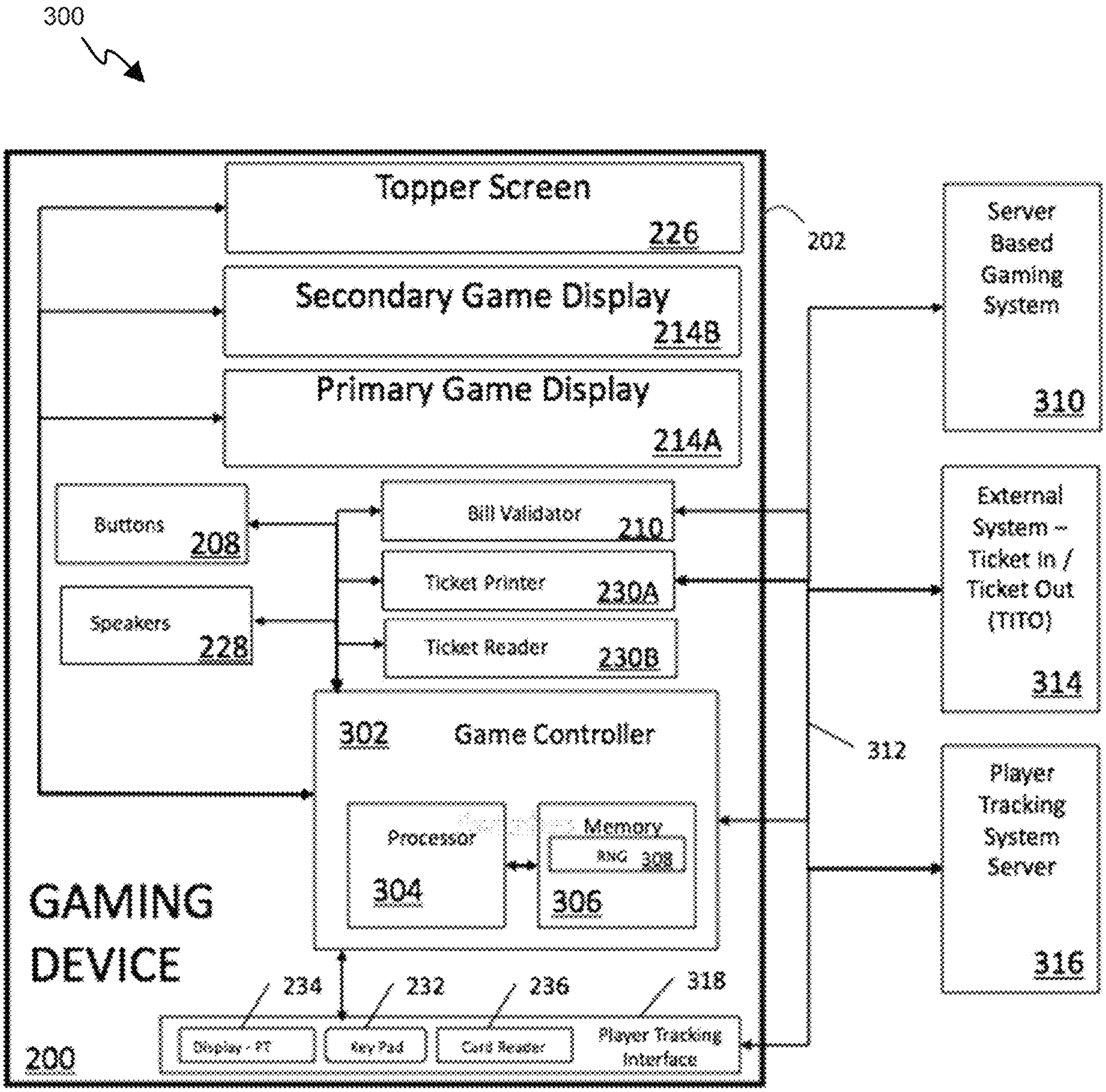
FIG. 2 is a diagram showing components of an example gaming machine.

FIG. 1 depicts an example of a gaming device 200 in accordance with various examples of the present disclosure. Referring to FIG. 1, the gaming device 200 may include a main cabinet 202 including a main door 204 which opens to provide access to the interior of the gaming device 200. In particular, the main cabinet 202 may house circuitry, electrical components, and electromechanical components of the gaming device 200. In particular, the main cabinet 202 may house a game controller (see, e.g., FIG. 2) configured to control the various components of the gaming device 200 and execute a wagering game as described in detail below. The main cabinet 202 may also include a button deck 206 with buttons 208, which a player may actuate in order to operate the gaming device 200 and play a wagering game. Various other components may be housed by the main cabinet 202 or mounted to the main cabinet 202. For example, the gaming device 200 includes a sound system and speakers 228 (as shown in FIG. 2) that may be mounted to or housed by the main cabinet 202 for playing game sound effects and music to enhance the player's game play experience.

A credit input mechanism 210 such as a bill validator or coin-in slot may also be mounted to the main cabinet 202. The credit input mechanism 210 may receive physical items associated with a monetary value such as coins, bills, etc. to permit the gaming device to establish an associated credit value of a credit meter. In some examples, a credit output mechanism such as coin tray or coin chute may also be mounted to the main cabinet 202. Such credit output mechanism may permit the gaming device 200 to dispense coins when a player cashes out any remaining credits on the credit meter or to dispense winning directly to the player in lieu of increasing the credit meter.

As shown, the gaming device 200 includes a main display 214 mounted above the button deck 206. The main display 214 may include a high-resolution LCD, plasma, LED, or OLED panel which may be in a portrait configuration with curvature radius from top to bottom as shown.

In some examples, the bill validator 210 may also function as a "ticket in" reader 230B that allows the player to use a casino issued credit ticket to load credit onto the gaming device 200 (e.g., in a cashless ticket system). In such cashless examples, the gaming device 200 may also include a "ticket out" printer 230A for outputting a credit ticket when a "cash out" button is pressed. Cashless ticket systems may be used to generate and track unique bar-codes that are printed on tickets. Such tickets allow players to avoid the use of bills and coins for loading credits on a credit meter of the gaming device 200. Instead, players may load credits using a ticket reader 230B and may cash out credits from the credit meter through the use of the ticket printer 230A.

In some examples, the gaming device 200 may include a player tracking interface 318 (see, e.g., FIG. 2) that includes a card reader 236, a transceiver for wireless communication with a player's smartphone, a key pad 232, and/or an illuminated display 234 for reading, receiving, entering, and/or displaying player tracking information. In such examples, the gaming device 200 may communicate with the server 316 via the player tracking interface 318 to send and receive player tracking information.

In various examples, the gaming device 200 may not include physical reels and instead shows game play functions on the main display 214. The gaming device 200 may further include an optional topper screen 226. The topper screen 226 may be used as a secondary game display for bonus play or may be used to show game features or attraction activities while the game is not in play. The topper screen 226 may also display any other information or media desired by the game designer or operator. In some examples, the topper screen 226 may also be used to display progressive jackpot prizes available to a player during play of gaming device 200.

A candle 224 may be mounted on the top of gaming device 200. In some examples, a player may activate the candle 224 via a button 208 in order to inform operations staff that the gaming device 200 has experienced a malfunction or that the player requires service.

While an example gaming device 200 has been described in regard to FIG. 1, certain examples of the present disclosure may be implemented by gaming devices that lack one or more of the above-described components. For example, not all gaming devices suitable for implementing examples of the present disclosure necessarily include topper screens, information panels, cashless ticket systems, and/or player tracking systems. Further, some suitable gaming devices may include a single game display having a mechanical reels or a video display. Moreover, other examples may be designed for bar tables and have displays that face upwards.

Many different types of wagering games, including mechanical slot games, video slot games, video poker, video black jack, video pachinko, keno, bingo, and lottery, may be provided by the gaming device 200. In particular, a gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select from the list a game that they wish to play.

Turning now to FIG. 2, a block diagram of some examples of a gaming system 300 is shown. FIG. 2 depicts internal electronic components of the example gaming device 200. FIG. 2 further shows such internal components connected to external systems via a communications network 312. The various instances of games available for play on the gaming device 200 are controlled by a game controller 302. The game controller 302 may include a processor 304 and memory 306 configured to store game software having a plurality of instructions that, when executed by the processor 304, cause the gaming device 200 to implement a wagering game. The memory 306 may include one or more mass storage devices or media housed within main cabinet 202.

The game controller 302 may also include a pseudorandom number generator or RNG 308. The RNG 308 can be implemented via hardware and/or software. Moreover, the RNG 308 may generate random numbers that are used in the operation of game play to ensure that game play outcomes are random and meet regulations for a game of chance.

Alternatively, in some examples, a game instance may be generated on a remote gaming device such as a server based gaming system 310. The game instance is communicated to gaming device 200 via network 312 and then displayed on gaming device 200. Gaming device 200 may execute game software, such as but not limited to video streaming software that allows the game to be displayed on gaming device 200. When an instance is stored on gaming device 200, the instance may be loaded from a memory (e.g., from a read only memory (ROM)) or from the server based gaming system 310 to the memory 306. The memory 306 may be RAM, ROM, a combination of the two types or another form of storage media that stores instructions for execution by processor 304.

Gaming device 200 may include a topper screen 226 or another form of a top box (e.g., a topper wheel) which sits on top of cabinet 202. In addition to the components described above, either main cabinet 202 or topper screen 226 may also house a number of other components which may be used to add features to a game being played on gaming device 200, including speakers 228, a ticket printer 230A which prints bar-coded tickets, a ticket reader 230B which reads bar-coded tickets, a key pad 232 for entering player tracking information, an illuminated display 234 for displaying player tracking information, a card reader 236 for receiving data and/or communicating information to and from media or a device such as a smart phone enabling player tracking. Ticket printer 230A may be used to print tickets for a cashless ticketing system 314.

Gaming device 200 may be connected over network 312 to player tracking system server 316. Player tracking system server 316 may be, for example, an OASIS 360® player tracking system manufactured by Aristocrat Technologies, Inc. Player tracking system server 316 may track play for individual players so that an operator may reward players in a loyalty program. To this end, a player may use the player tracking interface 318 that includes player tracking keypad 232, player tracking display 234, and card reader 236 to provide information from which the player tracking system server 316 may identify the player.

While FIG. 2 provides details regarding some examples of the gaming device 200, examples of the present disclosure may be implemented with gaming devices having more or fewer elements than are depicted in FIG. 2. For example, some gaming devices in accordance with examples of the present disclosure may lack a player tracking interface 318. Moreover, although the gaming system 300 shown in FIG. 2 illustrates one specific example gaming device 200, the gaming system 300 is by no means the only gaming device architecture for implementing various examples of the present disclosure. For example, an architecture having a single processor that handles communications as well as routing computations, etc. may be used. Further, other types of interfaces and media could also be used with the gaming device 200. The communication path between components may be bus based (as shown in FIG. 2) or switch fabric based (such as a cross-bar).

Figure 3:
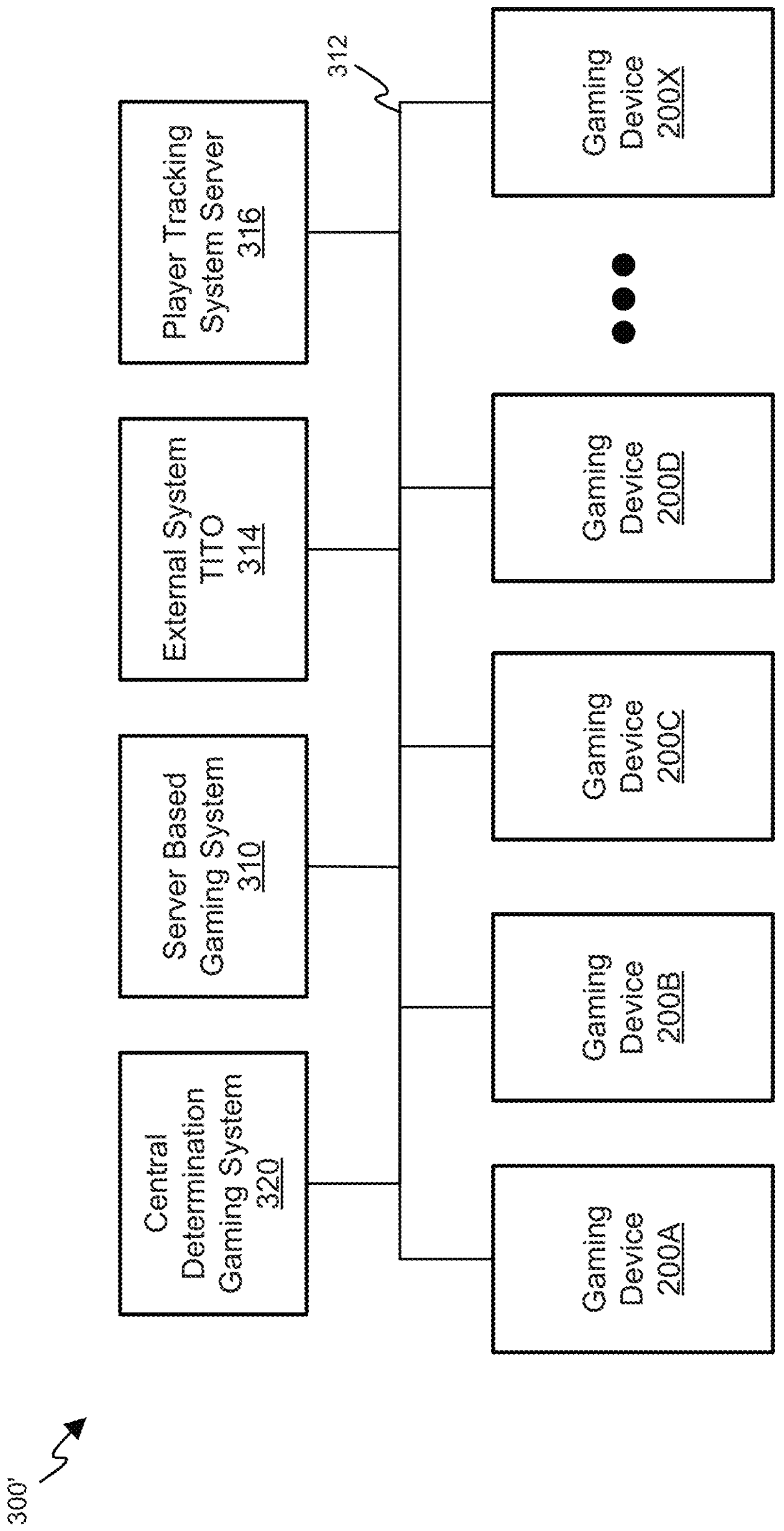
FIG. 3 is a diagram showing components of an example networked gaming system.

FIG. 3 depicts a gaming system 300' which is another example of the gaming system 300 of FIG. 2. The gaming system 300' includes a central determination gaming system 320. A game outcome may be generated on central determination gaming system 320. The game outcome is then transmitted over network 312 to any one of the gaming devices 200A-X that utilize the game outcome and display the result to the player. In various examples, such as in a class 2 game, the results of the primary game (e.g., bingo) may be transmitted over network 312 to the appropriate gaming device 200A-X for presentation to the player via a simulated game (e.g., a spinning reel game, keno, blackjack, etc.). For example, the gaming device 200A-X may receive the results of the primary game and generate a simulated game having results corresponding to the received results of the primary game.

Some examples of the present disclosure may be advantageously practiced via a networked server based gaming system 310. Examples of such networked server based systems are described in U.S. Pub. 2007/0026935, by Wolf et al., entitled "METHODS AND DEVICES FOR MANAGING GAMING NETWORKS" and filed Sep. 12, 2005, which is incorporated herein by reference in its entirety and for all purposes.

General Operation

Returning now to the example of FIG. 2, when a user wishes to play the gaming device 200, he or she inserts cash through the coin acceptor or bill validator 210. Alternatively, bill validator 210 may include ticket reader 230B enabling the acceptance of a printed ticket voucher which may be accepted as an indicia of credit when a cashless ticketing system 314 is used. At the start of the game, the player may enter playing tracking information using card reader 236, keypad 232, and the display 234. Further, other game preferences of the player playing the game may be read from a card inserted into the card reader 236. During the game, the player views game information using video displays 214A, 214B. Other game and prize information may also be displayed on topper screen 226.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input buttons 208, the video display screen 214 which may be a touch screen, or using some other user interface device which enables a player to input information into the gaming device 200. In some examples, the player may be able to access various game services such as concierge services and entertainment content services using video display screen 214 and one or more input devices.

During certain game events, the gaming device 200 may display visual, auditory, and other sensory effects that can be perceived by the player. These effects add to the excitement of a game, which makes a player more likely to continue playing. Auditory effects include various sounds that are projected by the speakers 228. Visual effects include flashing lights, strobing lights, or other patterns displayed from lights on the gaming device 200 or from lights behind an information panel. After the player has completed a game, the player may receive game credits, game tokens from a credit output mechanism such as a coin tray (not shown) or a ticket from printer 230A, which may be used for further games or to redeem a prize. Further, the player may receive a ticket for food, merchandise, or games from printer 230A.

Bingo Game

Further details regarding the operation and arrangement of the spinning reels provided to simulate a bingo game outcome will be addressed with reference to FIGS. 4A-9. While the gaming device 200 may simulate or animate spinning reels via main display 214, the below description does not distinguish between animated (i.e. video) reels and mechanical (i.e. electro-mechanical) reels. Unless otherwise explicitly specified in the below description or in the appended claims, the examples of the present disclosure are applicable to animated reels as well as mechanical reels.

Figure 4A:
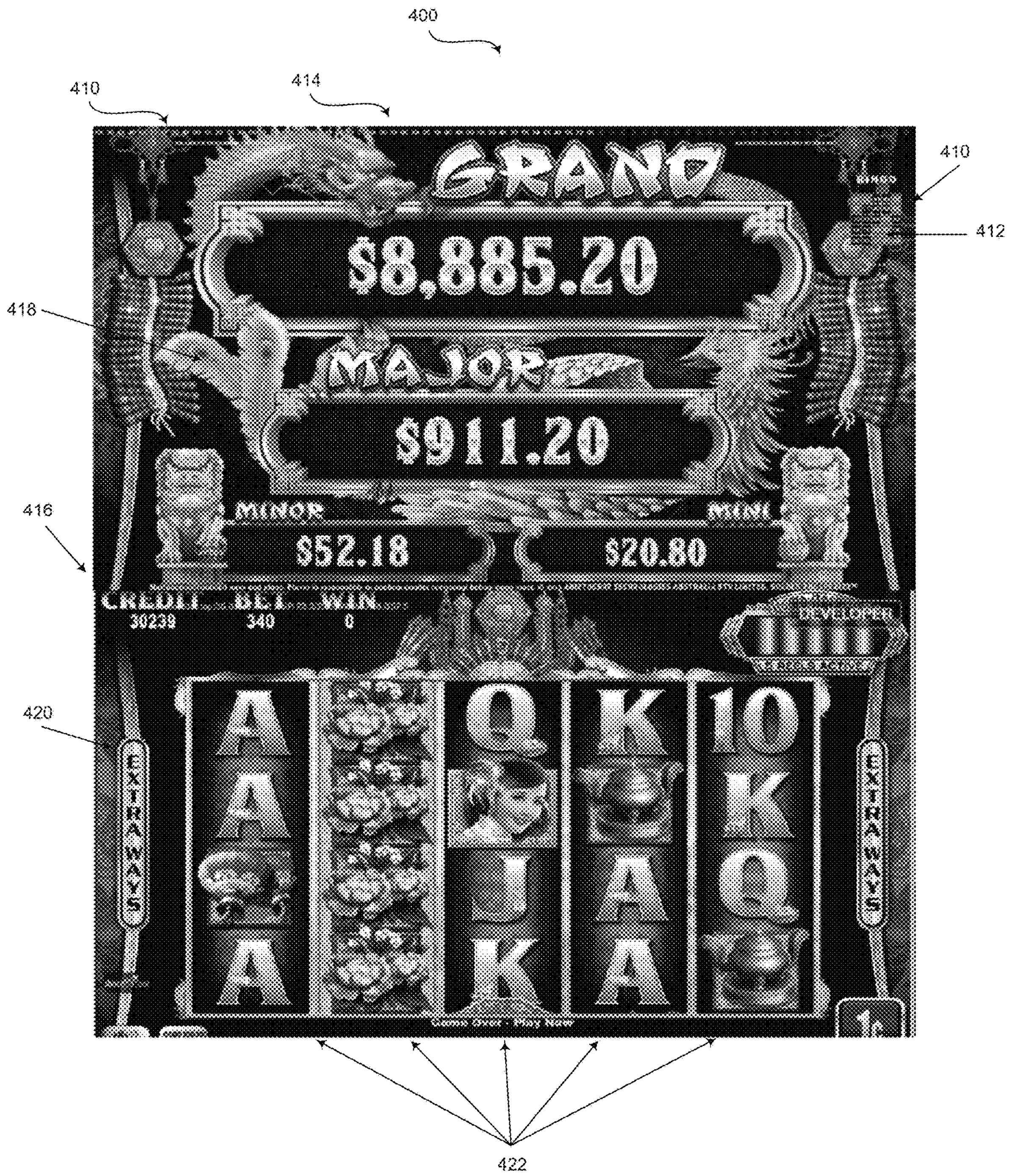
FIG. 4A depicts an example of a display of the example gaming machine of FIG. 1 during a main bingo game.

FIGS. 4A-9 depict examples of a display 400 at the gaming device 200 of FIG. 1 in various stages of example processes for a bingo game. The display 400 may include a bingo game display portion 410, a spinning reel game display portion 420, and a credit meter 416 showing an amount of credits (e.g. credit balance) held by a player of the gaming device 200. In various examples, the spinning reel game display portion 420 may correspond to the primary game display 214A and the bingo game display portion 410 may correspond to the secondary game display 214B portion of the main display 214 of the gaming device 200. In some examples, the bingo game display portion 410 and/or a spinning reel game display portion 420 may be repositioned. In the example of FIG. 4A, the display 400 also includes a bonus reward display portion 418 that displays GRAND, MAJOR, MINOR, and MINI reward amounts that correspond to potential rewards of a bonus game which may be triggered during any of the reel games.

The main bingo game may be a networked game that involves two or more networked gaming devices 200. The main bingo game may be entered (and/or initiated, started, begun, etc.) by a player when the player makes a bingo game wager, provided there are a sufficient number of players and/or gaming devices 200 (e.g., 2 or more) participating in the main bingo game. If there are too few players and/or gaming devices 200 participating, a "Waiting for Players" message, or some other message, may be displayed until enough players and/or gaming devices 200 participate. In the example of FIG. 4A, the amount of the bingo game wager is displayed adjacent to the credit meter 416, under "BET." In the example of FIG. 4A, the amount of the bingo game wager is 340 credits (e.g., $3.40). The bingo game wager may be deducted from the credit balance and/or credit meter 416. The player may make a bingo game wager using a user interface (e.g. buttons 208 and/or touch screen 214).

The one or more servers 310, 320 hosting the bingo game may receive a communication (and/or notification, message, etc.) from the gaming device 200 that the bingo game wager was made. The one or more servers 310, 320 hosting the bingo game may generate the main bingo card 412 in response to the communication, and transmit the main bingo card 412 to the gaming device 200. In some examples, the one or more servers 310, 320 may transmit information to the gaming device 200 and the gaming device may generate the main bingo card 412 based on the information. In some examples, more than one main bingo card 412 may be generated in response to a bingo game wager. The one or more servers 310, 320 may generate the main bingo card 412 (and/or information on which the main bingo card 412 is based) using an RNG. In some examples, the main bingo card 412 may be randomly selected from a set of main bingo cards 412 using an RNG, and/or some other method. In some examples, a player may select their own main bingo card 412 using the user interface of the gaming device 200. The gaming device 200 may display the main bingo card 412 in the bingo game display portion 410. In the example of FIG. 4A, the player has already made a bingo game wager, and been presented with a main bingo card 412.

Figure 4B:
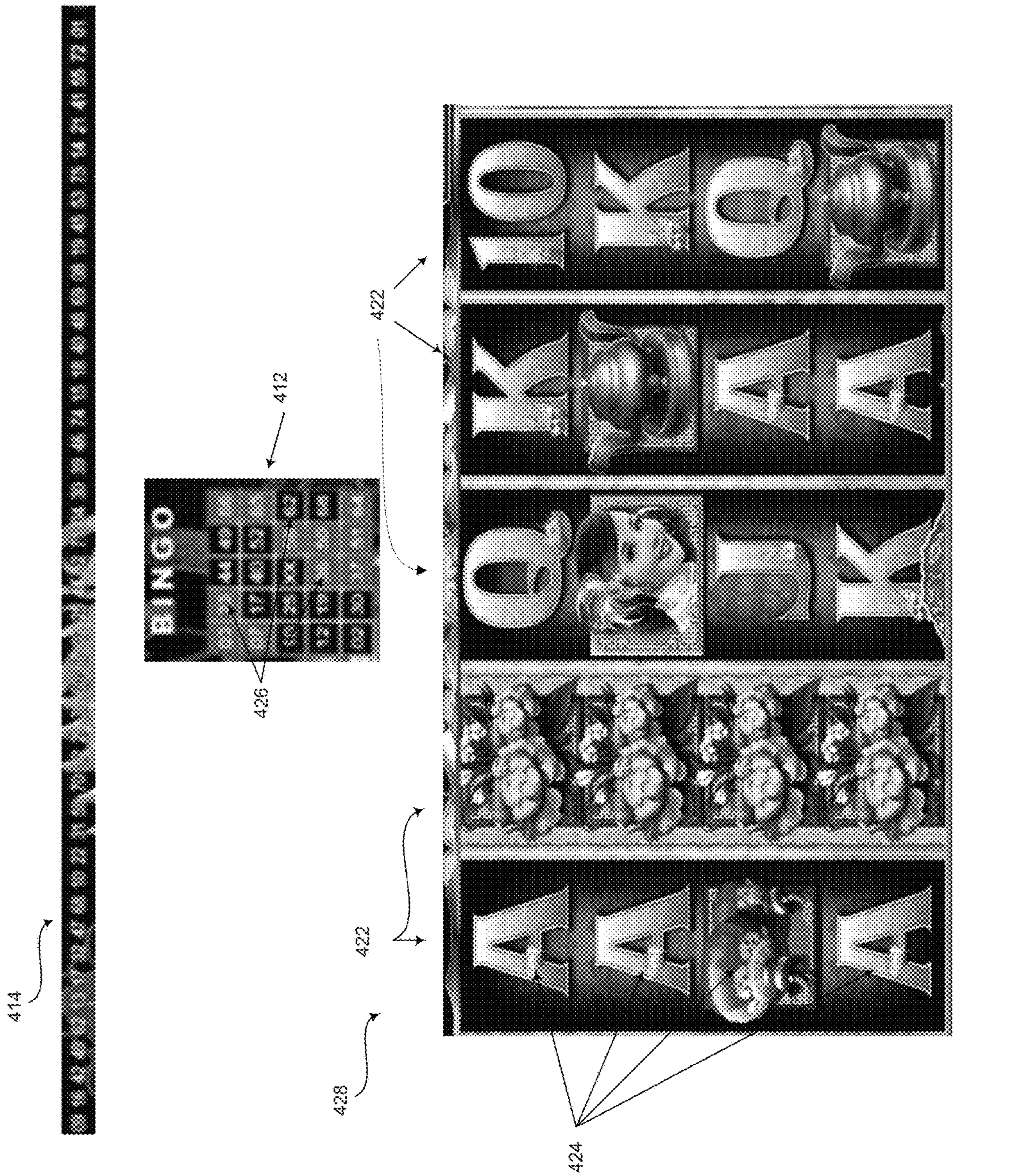
FIG. 4B depicts enlarged views of certain portions of the display of FIG. 4A.

The bingo game display portion 410 may include one or more main bingo cards 412 acquired by a player based on a wager (e.g. a bingo game wager). In the example of FIG. 4A, the display 400 shows a single main bingo card 412 in a bingo game display portion 410 at the upper right corner of the display 400. FIG. 4B shows an enlarged view of the main bingo card 412. In the example of FIGS. 4A and 4B, the main bingo card 412 is a 5×5 grid of cells 426 formed by five rows and five columns. The five columns are labeled with B, I, N, G, and O. Each of the cells 426 includes a number, except a center cell, which has a free/wild symbol. In the example of FIGS. 4A and 4B, no two cells 426 of the main bingo card 412 have the same number. In some examples, the main bingo card 412 may be of a different size (e.g., 6×6, 7×7, 10×10, etc.), the columns may not be labeled or labeled with different letters, and one or more cells 426 in a center row/column and/or center cell may include a number or some other symbol or mark rather than a free/wild symbol.

The bingo game display portion 410 may further include a bingo number listing 414. The servers 310, 320 hosting the bingo game may randomly generate a sequence of numbers forming the number listing 414. The servers 310, 320 may provide the number listing 414 to the gaming devices 200 participating in the bingo game for display at the gaming devices 200. In the example of FIG. 4A, the number listing 414 extends across the top of the display 410, beginning at the upper left corner. FIG. 4B includes an enlarged depiction of the number listing 414. The gaming devices 200 (and/or server 310, 320) may compare the sequence of numbers in the number listing 414 to each of the bingo cards 412 to identify matching numbers. In some examples, matching numbers may be visually distinguished from non-matching numbers in the main bingo card(s) 412 and/or the number listing 414 using a different color, highlighting, emphasis, and/or any suitable visual distinction.

Each main bingo game may include one or more game ending winning bingo patterns and/or one or more interim winning bingo patterns. A game ending winning bingo pattern may comprise a particular bingo pattern associated with a game ending main bingo game winning outcome (e.g. all cells of the main bingo card having numbers that match numbers in the bingo list of numbers). A game ending winning bingo pattern/outcome may end the main bingo game. The servers 310, 320 may generate bingo numbers 414 until one gaming machine 200 eventually obtains the game ending winning bingo pattern. A new listing of bingo numbers 414 may be generated after a game ending main bingo game winning outcome occurs, to begin a new main bingo game.

An interim winning bingo pattern may comprise one or more other interim winning bingo patterns associated one or more interim main bingo game winning outcomes. Interim winning bingo patterns and/or interim main bingo game winning outcomes may occur during the main bingo game without ending the main bingo game. In some examples, interim winning bingo patterns may include traditional bingo patterns such as, for example, a completed horizontal cell row of the bingo card, a completed vertical cell column of the bingo card, a completed diagonal cell row of the bingo card, four cell corners of the bingo card, and/or all the cells of the bingo card. In some examples, interim winning bingo patterns may comprise less traditional patterns, such as, for example, a seemingly randomly generated subset of cells disposed in no easily discernable arrangement.

A winning main bingo game outcome may be determined if there are one or more interim and/or game ending winning bingo combinations/patterns on the main bingo card. The bingo game outcome may be a loss for player(s) not achieving a winning bingo pattern. The winning or losing bingo game outcomes for each bingo card 412 may be provided to the corresponding gaming device 200 (and/or to the servers 310, 320). Bingo game winning outcomes may have associated rewards, depending on the winning bingo pattern. Different winning patterns may be associated with different rewards. The reward for a winning main bingo game outcome may be based on an amount wagered (e.g., bingo game wager), an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations.

Figure 4C:
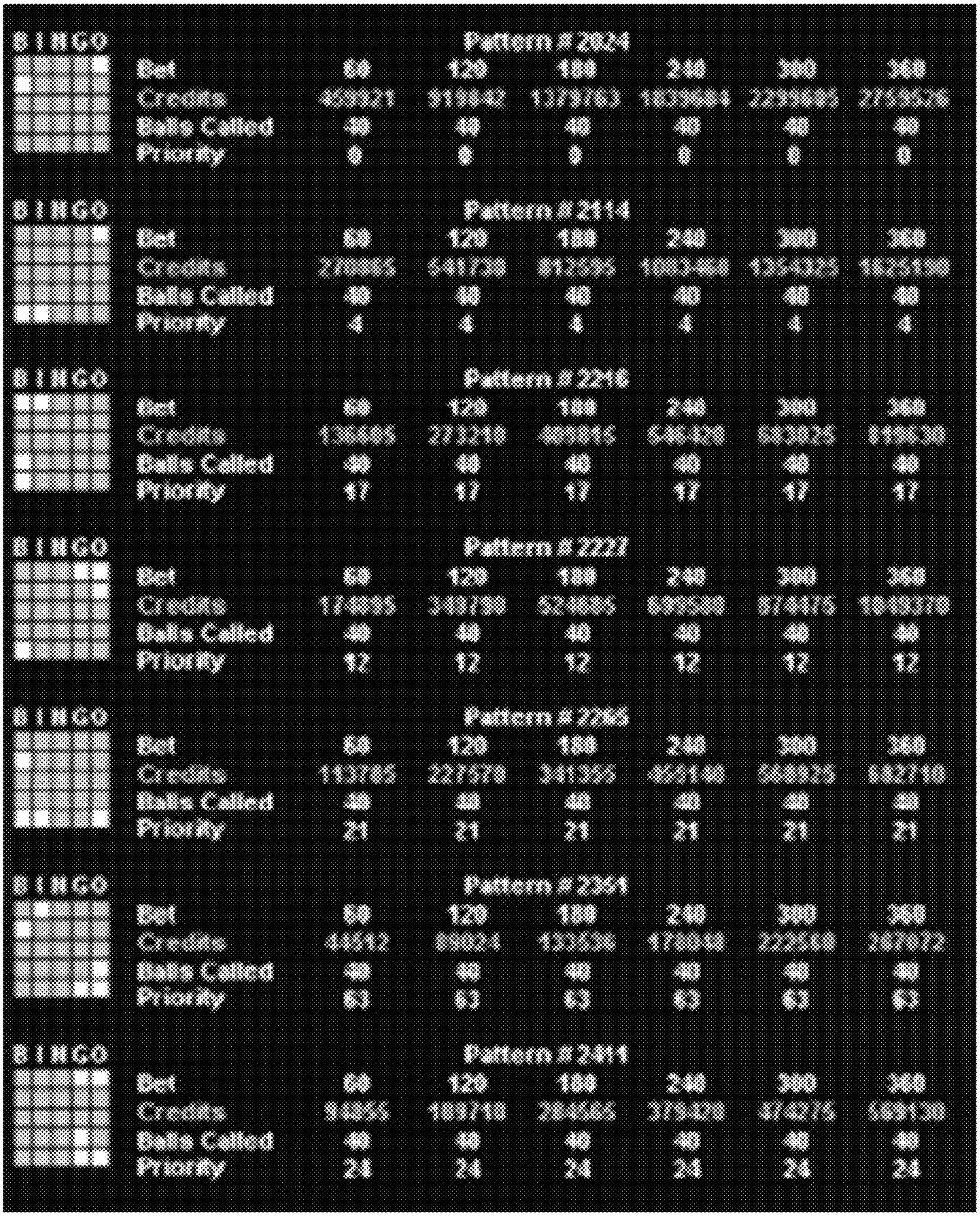
FIG. 4C depicts a portion of an example pay table associated with a main bingo game.

FIG. 4C shows an example bingo game pay table 430. The pay table 430 may be presented to a player via the gaming device 200. Information in the pay table 430 may be stored in memory 306 of the gaming device 200, on one or more of the servers 310, 320, and/or in an associated database. Information in the pay table 430 may be arranged by pattern number. In the example of FIG. 4C, the first (i.e., top most) pattern number is #2024, followed by #2114, #2216, #2227, and so on. Each pattern number may be associated with a winning bingo pattern, an associated reward (depending on bingo game wagers), a number of balls called to qualify for the reward (i.e., which and/or how many listed bingo numbers used), a priority ranking of the reward, and/or other information. Each winning bingo pattern may include several main bingo card cells 426. In some examples, the winning bingo pattern must be obtained before a certain amount of bingo numbers in the list of bingo numbers are revealed (i.e., balls called). In the example of FIG. 4C, all the bingo patterns shown in the pay table 430 must be achieved using the first 40 bingo numbers in the list of bingo numbers. Other bingo patterns in other portions of the pay table 430 (not shown) may have different ball call numbers.

Each winning bingo pattern in the pay table 430 may also be associated with a priority ranking. The priority ranking may distinguish overlapping winning bingo patterns. For example, if a player has a main bingo card 412 with all but one of its cells 426 matching one of the first 40 numbers in the list of bingo numbers 414, the main bingo card 412 would contain almost all of the winning bingo patterns in the pay table 430. In some examples, the player may be awarded the cumulative total of the rewards associated with each of the winning bingo patterns. However, in exemplary examples, the player may only receive the reward associated with the winning bingo pattern having the highest (lowest number) priority ranking. In the example of FIG. 4C, the first pattern (#2024) has the highest priority (i.e., 0). In some examples, the player may receive rewards associated with winning bingo patterns in a certain priority ranking range (e.g., highest 3 ranked rewards, highest and lowest ranking rewards, etc.). The gaming device(s) 200 (and/or server 310, 320) may evaluate wagers, patterns, ball call requirements, priority rankings, and/or other information in the bingo game pay table 430 to determine winning players of the main bingo game and/or associated rewards.

The winning and/or losing bingo game outcome may be presented to a player via a spinning reel game façade that is shown, animated, and/or simulated in a spinning reel game display portion 420. The spinning reel game may simulate one or more reel game outcomes less than or equal to the appropriate main bingo game outcome. For example, if the main bingo game outcome for a particular gaming machine is a losing outcome, the reel game for that gaming machine may simulate one or more similarly losing reel game outcomes. If the main bingo game outcome for a particular gaming machine is a winning outcome, the reel game for that gaming machine may simulate one or more reel game winning outcomes. In some examples, the available reel simulations may not provide for all possible main bingo game winning outcomes, so a main reel game outcome may be shown with a lesser reward. In such an example, the player may still receive the full reward for the main bingo game winning outcome, with the reward being presented as a combination of a credit reward for the displayed main reel game outcome, plus 'poof' credits. In exemplary examples, the cumulative reward for the one or more winning reel game outcomes will be less than or equal to the reward for the main bingo game winning outcome for a particular gaming machine.

The spinning reel game display portion 420 includes reels 422 each having display positions 424 for presenting symbols. FIG. 4B includes an enlarged depiction of the reels 422. In the example of FIG. 4B, the spinning reel game display portion 420 shows five reels 422. Each reel 422 has four display positions 424. In some examples, each reel 422 may each have three, five, six, seven, eight, nine, or any other suitable number of display positions 424. In the example of FIG. 4B, each display position 424 is filled with a symbol, such as a letter (e.g., A, Q, J, K), a number (e.g., 10), and/or a graphic/picture (e.g., flowers, person, pot). In some examples, the spinning reel game display portion 420 may provide three, four, six, or any other suitable number of reels 422. In some examples, a display position 424 may include no symbol. The symbols presented in the display positions 424 of the reels 422 make up a symbol matrix 428 (and/or grid).

Figure 5:
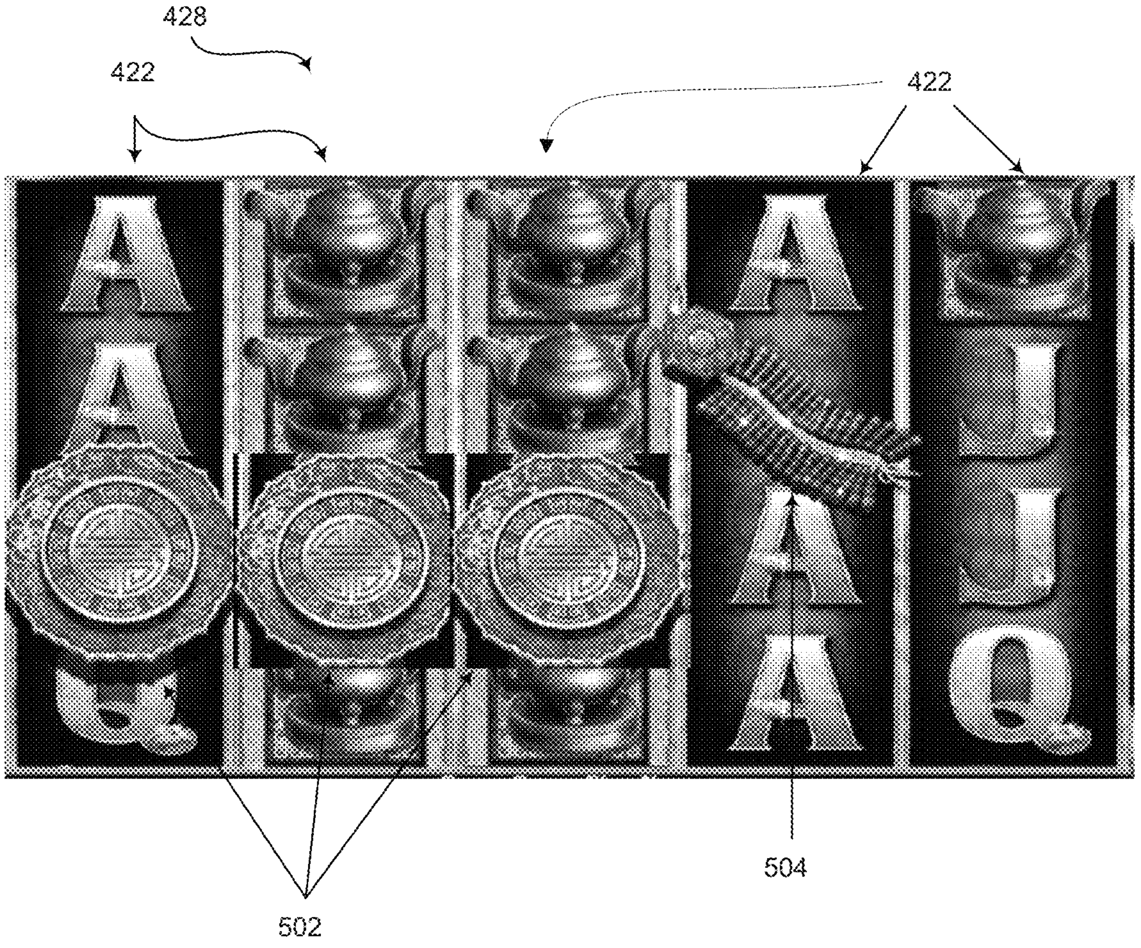
FIG. 5 depicts an example reel portion of a display of the example gaming machine of FIG. 1, with feature symbols.

Special symbols may also be presented in one or more display positions 424 of the spinning reel game symbol matrix 428. The special symbols may comprise one or more feature symbols, such as coins, for example. Special symbols may also comprise one or more wild (and/or wild card) symbols. FIG. 5 depicts a coin feature symbol 502 and a wild symbol 504 (shown as firecrackers). The reel game may be associated with a reel game pay table that specifies rewards for certain combinations and/or arrangements of symbols in the symbol matrix 428. In various examples, the awarded special symbols may or may not contribute to a winning combination of symbols.

In some examples, GRAND, MAJOR, MINOR, and/or MINI reward amounts may be shown in a bonus reward display portion 418. In some examples, if the main bingo game outcome includes a GRAND, MAJOR, MINOR and/or MINI reward, a bonus game may sometimes be awarded. In some examples, one or more special symbols may be included in a symbol matrix 428 during a reel game to indicate a bonus game has been awarded, and a player may enter a bonus game that presents a win of the GRAND, MAJOR, MINOR, and/or MINI reward amounts in the bonus reward display portion 418.

After the bingo game outcome is determined, the game controller 302 of the gaming device 200 may determine a symbol matrix 428 to provide in the reels 422 of the reel game display portion 420. The game controller 302 may be configured to cause the reels in the spinning reel game display portion 420 to spin and then stop to present the determined symbol matrix 428. The symbol matrix 428 may include one or more symbol combinations that are associated with one or more rewards. The stopped outcome (i.e. reel game outcome) of the spinning reel game may correspond to the outcome of the main bingo game, such that the symbol matrix 428 may include one or more combinations/arrangements of symbols associated with a winning or losing reel game outcome. The gaming device 200 (and/or game controller 302 of the gaming device 200) may analyze the symbol matrix 428 to determine whether winning reel combinations/arrangements/patterns are present. If a winning reel combination is present, the symbols included in the winning reel combination may be highlighted, emphasized, and/or otherwise indicated. The gaming device 200 may provide a reward for the main bingo game winning outcome (and/or award, payout, prize, etc.) that also corresponds to the winning reel combination (e.g., as set forth in an associated simulated reel game pay table). If the main bingo game outcome was a losing outcome, then no winning reel game combinations will be presented, and the reel game outcome will also be displayed as a losing outcome.

The amount won (i.e., reward), if any, as the outcome of the main bingo game may be less than or equal to the amount won (i.e., reward), if any, as the outcome of the spinning reel game. For example, if a player achieved a main bingo game winning outcome, one or more winning symbol combinations may be presented in the symbol matrix 428 of the reel game, in order to achieve a simulated reel game winning outcome. More particularly, if the player should receive thirty credits as a reward of the main bingo game (as determined by a comparison of the main bingo card 412 and bingo number listing 414 with an associated main bingo pay table 430), then the spinning reel game may be spun and stopped in order to display a winning reel outcome having a reward of thirty credits (as determined by a comparison of a winning symbol matrix 428 with an appropriate reel game pay table). If no reward was won as an outcome of the main bingo game (i.e., a losing bingo outcome), the spinning reel game may display an award of zero credits.

A feature bingo game may be rewarded as part of an outcome of the main bingo game. The feature bingo game may be determined by the game controller 302 and/or by the servers 310, 320 as part of a winning bingo outcome of the main bingo game. For example, the feature bingo game may be part of (or all of) the main bingo game outcome and/or the simulated reel game outcome reward for a particular gaming device 200. In some examples, the main bingo game pay table 430 may include one or more feature game flags associated with one or more main bingo game winning patterns to indicate whether a feature game should be included as part of the simulated outcome of the spinning reel game. The feature bingo game may be rewarded in addition to, or instead of, a monetary (and/or credit increasing) main bingo game reward. The triggering of the feature bingo game may be presented to the player during play of the simulated spinning reel game as the appearance of a certain number of (and/or arrangement of) feature symbols 502 in the symbol matrix 428. Feature symbols 502 may include, for example, honey bee feature symbols, coin feature symbols (see, e.g., FIG. 5), or any other suitable feature symbols. In certain examples, the feature symbol 502 may be a sub-symbol presented at a display position 424 with a standard symbol. In some examples, three or more feature symbols 502 in a symbol matrix 428 may be displayed to simulate the trigger of a feature bingo game. FIG. 5 shows three feature symbols 502 (presented as coins) in a symbol matrix 428, which may simulate the trigger of a feature bingo game. While the feature symbols 502 are aligned in the same row in the example of FIG. 5, in some examples the feature symbols 502 may simulate the trigger of a feature bingo game even if they are not aligned in a column or row, or otherwise arranged, as long as a certain number are present in the symbol matrix 428 in some display position 424.

The feature bingo game may be partially associated with the original bingo game. For example, the feature bingo game may include a feature bingo card 512, and may evaluate the feature bingo card 512 against the original/main bingo number listing 414. In some examples, the feature bingo game may use the main bingo card 412 and a different (i.e., second) listing of bingo game numbers. The feature bingo game may be associated with a feature bingo game pay table that is different from the main bingo game pay table used for the main bingo game, such that winning bingo patterns, ball call requirements, priority rankings, and/or rewards of the feature bingo game (and/or feature bingo card 512) may be different than winning bingo patterns and/or awards of the main bingo game (and/or main bingo card 412).

As with the original bingo game, one or more feature bingo game outcomes may be determined by the gaming device(s) 200 (and/or one or more servers 310, 320). The one or more feature bingo game outcomes may be based on comparisons between the bingo number listing 414 and the numbered cells 426 of the feature bingo card 512. The comparisons may determine if the feature bingo card 512 contains any winning bingo combinations/patterns. The one or more feature bingo game outcomes may be simulated in a feature reel game façade with one or more feature reel game outcomes. In some examples, the available reel simulations may not provide for all possible feature bingo game winning outcomes, so a feature reel game outcome may be shown with a lesser reward. In such an example, the player may still receive the full reward for the feature bingo game winning outcome, with the reward being presented as a combination of a credit reward for the displayed feature reel game outcome, plus 'poof' credits. The cumulative rewards for the one or more feature reel game outcomes on a particular gaming machine 200 may be less than or equal to the reward(s) for the feature bingo game outcome for that particular gaming machine 200.

The gaming machine 200 may prompt a player to make a selection (e.g. a volatility selection) before proceeding with the feature bingo game. The selection may be presented to the player as several options for the feature reel games. For example, the player may be prompted to select between several different combinations of free spins and/or wild symbols. The selected free spins and/or wild symbols may be implemented during the associated feature reel game simulation. For example, the selected number of free spins may equal the number of feature reel game outcomes (e.g. one outcome for each free spin). Likewise, the selected number of wild symbols may equal the number of wild symbols displayed in the spinning reels during the feature reel game simulation. Thus, the volatility selection may be perceived as impacting a volatility of the feature reel game. The volatility selection may influence the overall expected return to player (RTP) of the bingo game, or the RTP expectancy may remain substantially unaffected.

The selected free spin and/or wild symbol combination (i.e., volatility selection) may also impact the volatility of the feature bingo game. A higher number of free spins and a lower number of wild symbols may correspond to a relatively low level of volatility, while a lower number of free spins and a higher number of wild symbols may correspond to a higher level of volatility. The game controller 302 (and/or gaming servers 310, 320) may dynamically generate a feature bingo pay table based on the selected volatility level, or a set of predetermined pay tables may be associated with the volatility levels and a corresponding pay table may be chosen by the game controller 302 (and/or gaming servers 310, 320) based on the volatility selection. In some examples, higher volatility levels may correspond to a higher probability of achieving smaller and/or larger wins, and lower volatility levels may correspond to a higher probability of achieving mid-level wins. In some examples, higher volatility levels may correspond to fewer and/or more difficult to achieve winning bingo patterns, with lower odds (and/or likelihood) of winning, than if there was a lower volatility level. In some examples, higher volatility levels may also correspond to fewer allowed ball calls to qualify for the winning bingo patterns. However, with a higher volatility selection, the winning patterns/combinations that are in the feature pay table may be associated with larger rewards than if there was a lower volatility level. Likewise, lower volatility levels may correspond to more and/or easier to achieve winning bingo patterns, with higher odds (and/or likelihood) of winning and/or more allowed ball calls, than if there was a higher volatility level. However, the winning patterns/combinations that are in the lower volatility pay table may be associated with smaller rewards than if there was a higher volatility level.

In some examples, a higher volatility selection may be a combination of a lower number of free spins, and a larger number of wild symbols placed on the reels for each free spin. This higher volatility selection may provide fewer opportunities (i.e. fewer free spins) to achieve a simulated winning reel spin outcome, but a higher likelihood that any winning reel spin outcome will be comprised of a greater number of winning symbols (i.e. base symbols combined with wild symbols) which may correspond to the display of higher paying rewards. Similarly, in some examples, a lower volatility selection may be a combination of a higher number of free spins, and a lower number of wild symbols placed on the reels for each free spin. This lower volatility selection may provide more opportunities (i.e. more free spins) to achieve a simulated winning reel spin outcome, but a higher likelihood that any winning reel spin outcome will be comprised of a fewer number of winning symbols, which may correspond to the display of lower paying rewards.

Figure 6:
FIG. 6 depicts an example of a display of the example gaming machine of FIG. 1 during a volatility selection.
Figure 7:
FIG. 7 depicts the example display of FIG. 6 after volatility selection.

FIG. 6 shows example volatility options presented to a player as several banners 602 in the reel game display portion 420. Each banner 602 corresponds to one volatility option for the feature reel game, with each volatility option including a number of free spins and a number of wild symbols. The banner 602*a*, displaying 6 free games and 48 wild symbols, is the most volatile (and/or highest volatility level) option shown in FIG. 6. The banner 602*c*, displaying 25 free games and 12 wild symbols, is the least volatile (and/or lowest volatility level) option shown in FIG. 6. The middle banner 602*b* comprises a "Mystery Choice" in which the player allows the gaming device 200 to randomly select a volatility option. The random volatility option may correspond to one of the volatility options presented in the banners 602 shown on the display 400 or may correspond to a game determined random combination of 25, 15, 10, or 6 free games and 12, 24, 36 or 48 wild symbols. Additional random combinations of a number of free games and a number of wild symbols are of course also possible, A player may select one of the volatility options shown in the banners 602 using the user interface (e.g. buttons 208 and/or touch screen 214) of the gaming device 200. As shown in FIG. 7, the selected banner 602 may be highlighted by making the banner 602*c* brighter than the other banners 602. In some examples, the selected banner 602 may be highlighted, indicated, and/or emphasized using some other method.

Figure 8:
FIG. 8 depicts an example of a display of the example gaming machine of FIG. 1 during free spins of a feature bingo game.
Figure 9:
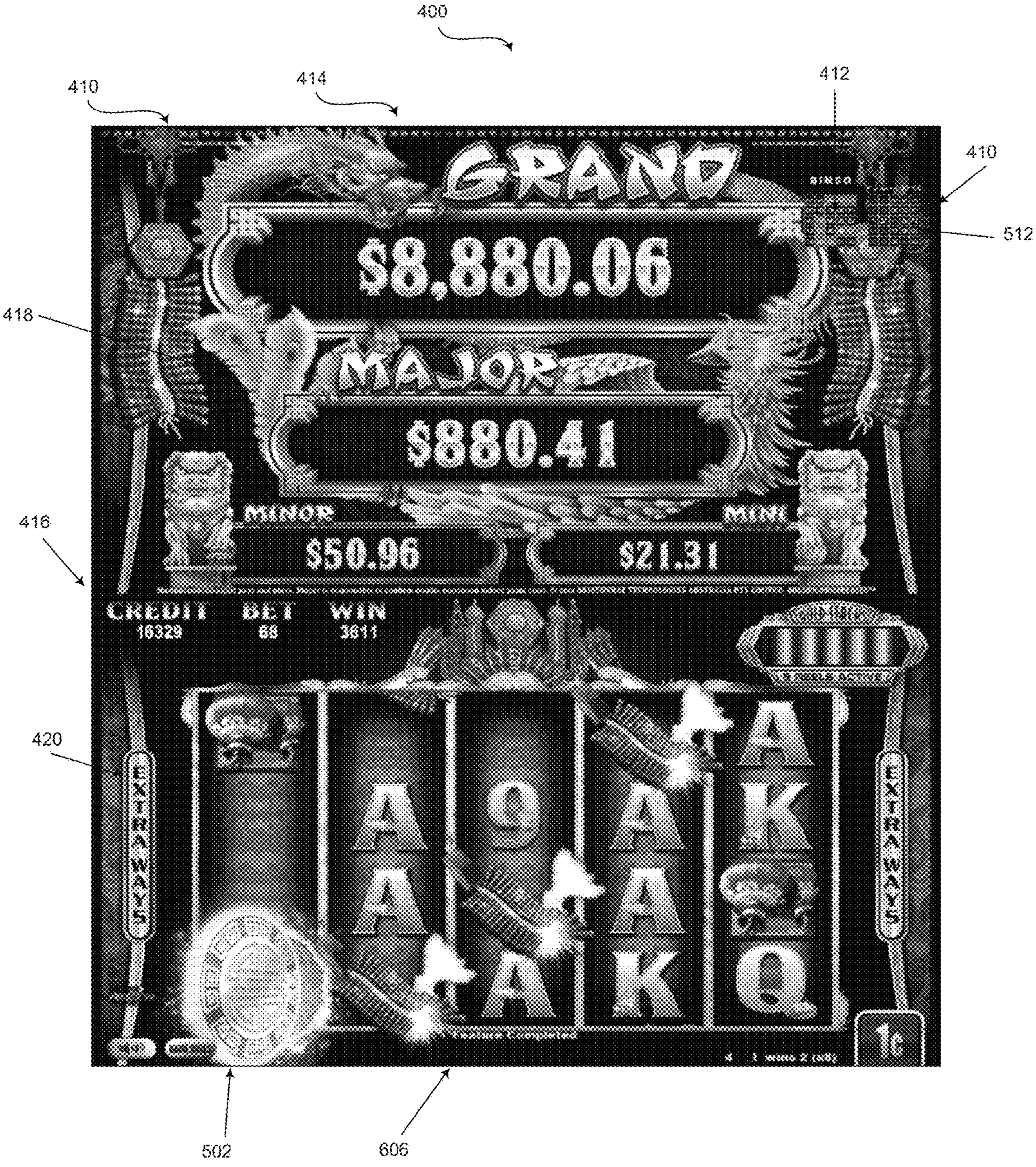
FIG. 9 depicts an example of a display of the example gaming machine of FIG. 1 at the end of free spins of the feature bingo game.

Once the player has made a selection, the feature bingo card 512 may be added to the bingo game display portion 410 of the display 400. In the example of FIGS. 7-9, the feature bingo card 512 is depicted alongside the main bingo card 412 in the upper right corner of the display 400. The feature bingo card 512 may be generated by the servers 310, 320 using an RNG, and/or some other method. In some examples, the feature bingo card 512 may be randomly selected from a set of feature bingo cards 512 (e.g., using an RNG, and/or some other method). The generated feature bingo card 512 may be similar to the main bingo card 412 in that the feature bingo card 512 has the same number of cells 426 (with each cell 426 including one number). However, the numbered cells 426 on the feature bingo card 512 may be different than the numbered cells 426 on the main bingo card 412. The numbered cells 426 of the feature bingo card 512 may be evaluated against the same bingo number listing 414 used in play of the main bingo game in order to determine a feature bingo game outcome and an associated feature bingo game award. The feature bingo game outcome may be based on feature bingo game winning patterns set forth in a feature bingo game pay table associated with the feature bingo game. The feature bingo game pay table may define various winning feature bingo game patterns that may provide a reward. The feature pay table may be dynamically generated by the gaming servers 310, 320 and/or gaming device(s) 200 (and/or gaming controller 302 of the gaming machine 200) based on the volatility option selected by the player, or a set of predetermined pay tables may be associated with the volatility levels and a corresponding pay table may be chosen by the gaming device(s) 200 (and/or gaming servers 310, 320) based on the volatility selection. In some examples, the feature bingo game pay table may be determined based on other factors instead of, or in addition to, the volatility selection, including, for example, number of participating bingo players, main bingo game outcome, original bingo wager, and/or other appropriate factors. The feature bingo game outcome evaluation may determine if there are any winning feature bingo game patterns in the feature bingo game pay table that correspond to bingo patterns formed by numbered cells 426 on the feature bingo card 512 that match numbers in the bingo listing 414.

Once a feature bingo game outcome is determined, a feature spinning reel game may simulate one or more feature reel game free spins. In some examples, the feature reel game will simulate a number of free spins that is equal to the number of free spins of the volatility option 602 selected by the player. In some examples, the reel game display portion 420 may display a counter 604 that counts the number of free spins (and/or free games) played (and/or simulated) out of the total number selected. In the example of FIG. 8, the counter 604 is displayed below the middle reel 422 in the reel display portion 420 of the display 400. When the free spins of the feature reel game are completed, an appropriate message 606 may be displayed to the player. In the example of FIG. 9, the message is displayed below the middle reel 422 in the reel display portion 420 of the display 400, similar to the where the counter 604 was displayed. An emphasized feature symbol may additionally, or alternatively, be displayed to indicate to the player that the feature reel game has been completed. In the example of FIG. 9, a feature coin symbol 502 is shown to the player in the lower left corner of the reel display portion 420, in a bright enlarged fashion, to indicate to the player that the feature reel game has been completed.

Each simulated feature reel game free spin may have a feature reel game outcome associated with one or more feature reel game rewards, similar to the reel game outcomes and/or rewards described above. The symbol combinations that comprise feature reel game winning combinations may be the same as, or different from, the symbol combinations that comprise main reel game winning combinations. In some examples, the pay tables associated with the feature reel games may be the same as, or different from, the pay tables for the main reel games described above. The cumulative total of the simulated feature reel game rewards won during the free spins may be less than or equal to the feature bingo game reward(s) associated with the feature bingo game outcome.

Figure 10:
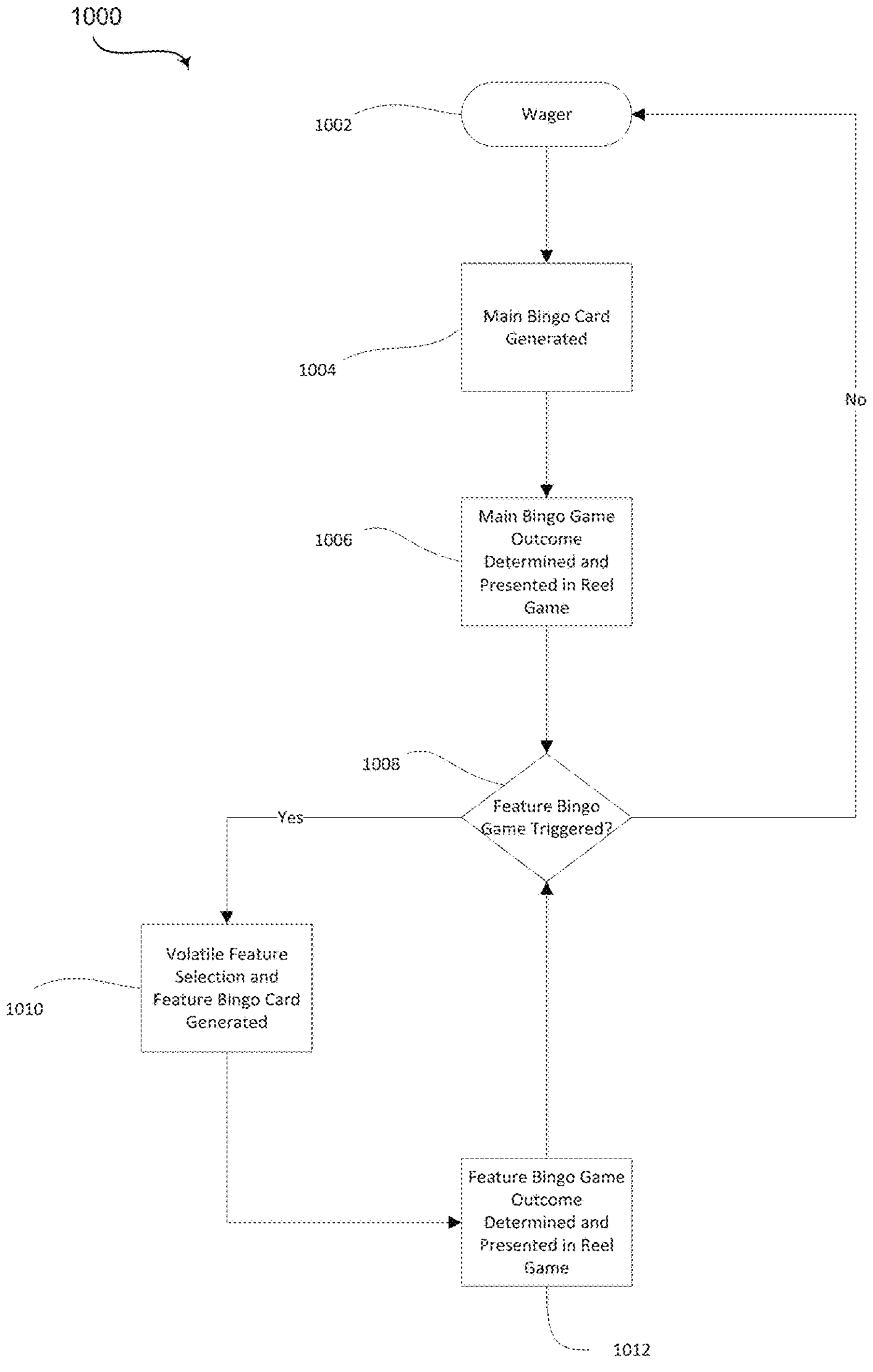
FIG. 10 is a flow chart depicting an example method of operation of the example gaming machine of FIG. 1.

FIG. 10 sets forth a flow chart illustrating steps of an example feature bingo game method 1000. At step 1002, the player makes a wager (e.g., a bingo game wager) via a user interface (e.g. buttons 208 and/or touch screen 214) of the gaming machine 200. At step 1004, a main bingo card 412 is generated (and/or selected) in response to the wager. Assuming enough players are participating in the main bingo game, a main bingo number listing 414 (i.e. a bingo ball draw) will be generated. In some examples, the main bingo number listing 414 may already have been generated prior to step 1004, such as, for example, where the main bingo game was already underway prior to step 1004 and/or 1002. At step 1006, the main bingo card 412 is compared with the bingo number listing 414 and an associated main bingo game pay table 430, and a main bingo game outcome (with an associated reward) is determined. A feature bingo game award may be included in the main bingo game outcome. During the same step 1006, the gaming machine 200 simulates a spinning reel game to present a reel game outcome having a reward that is less than or equal to all or a portion of the reward associated with the main bingo game outcome. At step 1008, a determination is made whether the main (or feature) bingo game outcome includes a feature bingo game award. The determination may have been made in step 1006 when determining the main bingo outcome, and may have comprised determining if the outcome of the main bingo game includes a reward of a feature bingo game. However, the determination may be presented to the player through a reel game simulation having a reel game outcome that includes a proper number and/or arrangement of feature game trigger symbols (e.g., three coin feature symbols 502) to trigger a feature bingo game. If a feature bingo game is triggered, then play proceeds to step 1010. If a feature bingo game is not triggered, play will return to the first step 1002.

Assuming a feature game is triggered, volatility options for the feature bingo game are presented to the player at step 1010. The player selects one of volatility options for establishing the number of free games and the number of wild symbols to be used in the free games. The feature bingo card 512 is then generated and/or selected once the volatility selection is made. During the same step 1010, a feature bingo game pay table may be generated and/or selected based on the volatility selection. At step 1012, the feature bingo card 512 is evaluated against the feature bingo game pay table using the bingo number listing 414. Any feature bingo game winning patterns are determined, and a feature bingo game outcome and associated reward is determined based on the evaluation. The feature reel game is simulated using the chosen number of free games and wilds to present the reward amount for the feature bingo game outcome to the player. After the feature reel game simulation completes, any feature bingo game winning patterns may be highlighted (and/or indicated, emphasized, etc.) to the player in the feature bingo card 512 and/or bingo number listing 414. After completion of the feature reel game in step 1012, play proceeds back to step 1008 determine if there were any feature bingo games triggered during the feature reel game. The determination may actually be made in step 1012 when determining the feature bingo outcome, and may comprise determining if the outcome of the feature bingo game includes a reward of another feature bingo game. However, the determination may be presented to the player through a feature reel game simulation having a feature reel game outcome that includes a proper number and/or arrangement of feature game trigger symbols (e.g., three coin feature symbols 502) to simulate the trigger of another feature bingo game. In such an example, there may be multiple nested feature bingo games that occur one after the other. If no other feature bingo games were triggered, play may return to step 1002.

Further examples of the method will be apparent from the above description of the system. It will be appreciated that at least part of the method may be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art that many modifications may be made without departing from the spirit and scope of the disclosure. In particular, it will be apparent that certain features of examples of the disclosure can be employed to form further examples.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various examples of the disclosure.

What is claimed is:

1. A gaming machine for use with a gaming server, comprising:

a display;

a user interface;

one or more memory devices storing instructions, a main game pay table, a plurality of feature game pay tables, main game reel simulations for the main game pay table, and feature game reel simulations for the plurality of feature game pay tables;

wherein the main game pay table includes a pay table entry for each main game winning bingo pattern;

wherein each pay table entry in the main game pay table includes a main game payout for the respective main game winning bingo pattern;

wherein each pay table entry in a subset of the pay table entries includes a feature game flag that indicates that a feature game is to be triggered in response to the respective main game winning bingo pattern; and wherein each feature game pay table of the plurality of feature game pay tables provides feature game payouts for feature game winning bingo patterns at a volatility specific for the respective feature game pay table; and a game controller executing the instructions stored in the one or more memory devices, wherein execution of the instructions causes the game controller to:

present, via the display, a main bingo game outcome as one or more of the main game reel simulations in response to a main game bingo pattern corresponding to a main game winning bingo pattern in the main game pay table;

initiate a play of a feature game in response to the pay table entry for the main game winning bingo pattern including the feature game flag;

select a feature game pay table from the plurality of feature game pay tables that provides the volatility corresponding to a volatility option selected by a player via the user interface;

apply a feature game bingo number listing to a feature game bingo card to obtain a feature game bingo pattern;

select, based on the selected feature game pay table, one or more feature game reel simulations from the available feature game reel simulations for the selected volatility option; and present, via the display, a feature game outcome as one or more feature game reel simulations from available feature game reel simulations for the selected feature game pay table.

2. The gaming machine of claim 1, wherein execution of the instructions causes the game controller to:

apply a main game bingo number listing to a main game bingo card to obtain the main game bingo pattern; and select the one or more main game reel simulations from the main game reel simulations per application of the main game bingo pattern to the main game winning bingo patterns of the main game pay table.

3. The gaming machine of claim 2, wherein execution of the instructions causes the game controller to use a same bingo number listing for the main game bingo number listing and the feature game bingo number listing.

4. The gaming machine of claim 1, wherein execution of the instructions causes the game controller to select the feature game reel simulations such that presentation of the selected feature game reel simulations presents a number of spins specified by the selected volatility option.

5. The gaming machine of claim 4, wherein a first volatility option of a plurality of volatility options specifies a larger number of spins than specified by a second volatility option of the plurality of volatility options.

6. The gaming machine of claim 1, wherein execution of the instructions causes the game controller to display the selected one or more feature game reel simulations using reels carrying a number of wild symbols specified by the selected volatility option.

7. The gaming machine of claim 6, wherein a first volatility option of a plurality of volatility options specifies a larger number of wild symbols than specified by a second volatility option of the plurality of volatility options.

8. A method of a gaming machine, comprising:

selecting one or more main game reel simulations from available main game reel simulations in response to a pay table entry in a main game pay table corresponding to a main game bingo pattern obtained for a main game, wherein the main game pay table includes a pay table entry for each main game winning bingo pattern, wherein each pay table entry in the main game pay table includes a main game payout for the respective main game winning bingo pattern, and wherein each pay table entry in a subset of the pay table entries includes a feature game flag that indicates that a feature game is to be triggered in response to the respective main game winning bingo pattern;

presenting, on a display of the gaming machine, the one or more main game reel simulations selected from the available main game reel simulations for the main game bingo pattern;

initiating a play of a feature game in response to the pay table entry including the feature game flag;

receiving, via a user interface of the gaming machine, input that selects a volatility option from a plurality of volatility options displayed on the display of the gaming machine;

selecting, with a controller of the gaming machine, a feature game pay table corresponding to the selected volatility option from a plurality of feature game pay tables, wherein each feature game pay table of the plurality of feature game pay tables provides feature game payouts for feature game winning bingo patterns at a volatility specific for the respective feature game pay table; and presenting, on the display, one or more feature game reel simulations selected from available feature game reel simulations associated with the selected volatility option.

9. The method of claim 8, comprising:

applying a bingo number listing to a main game bingo card to obtain the main game bingo pattern; and identifying the pay table entry of the main game pay table based on the main game bingo pattern.

10. The method of claim 9, comprising:

applying the same bingo number listing to a feature game bingo card to obtain a feature game bingo pattern; and selecting the one or more feature game reel simulations based on an application of the feature game bingo pattern to the selected feature game pay table.

11. The method of claim 8, comprising selecting the feature game reel simulations such that presentation of the selected feature game reel simulations presents a number of spins specified by the selected volatility option.

12. The method of claim 11, wherein a first volatility option of the plurality of volatility options specifies a larger number of spins than specified by a second volatility option of the plurality of volatility options.

13. The method of claim 8, comprising presenting the selected one or more feature game reel simulations using reels carrying a number of wild symbols specified by the selected volatility option.

14. The method of claim 13, wherein a first volatility option of the plurality of volatility options specifies a larger number of wild symbols than specified by a second volatility option of the plurality of volatility options.

15. A non-transitory computer-readable medium comprising instructions that, in response to being executed, cause a gaming machine to:

present, on a display of the gaming machine, one or more main game reel simulations selected from available main game reel simulations in response to a pay table entry in a main game pay table corresponding to a main game bingo pattern obtained for a main game, wherein the main game pay table includes a pay table entry for each main game winning bingo pattern, wherein each pay table entry in the main game pay table includes a main game payout for the respective main game winning bingo pattern, and wherein each pay table entry in a subset of the pay table entries includes a feature game flag that indicates that a feature game is to be triggered in response to the respective main game winning bingo pattern;

initiate a feature game in response to the pay table entry associated with the main game bingo pattern including the feature game flag;

select a feature game pay table from a plurality of feature game pay tables based on a volatility option selected from a plurality of volatility options, wherein each feature game pay table of the plurality of feature game pay tables provides feature game payouts for feature game winning bingo patterns at a volatility specific for the respective feature game pay table; and present a feature bingo game outcome as one or more feature game reel simulations selected from available feature game reel simulations associated with the selected feature game pay table and the selected volatility option.

16. The non-transitory computer-readable medium of claim 15, wherein the instructions, when executed, cause the gaming machine to:

apply a bingo number listing to a main game bingo card to obtain the main game bingo pattern; and select the one or more main game reel simulations from available main game reel simulations per application of the main game bingo pattern to the main game pay table.

17. The non-transitory computer-readable medium of claim 15, wherein the instructions, when executed, cause the gaming machine to:

apply the same bingo number listing to a feature game bingo card to obtain a feature game bingo pattern; and select the one or more feature game reel simulations based on an application of the feature game bingo pattern to the selected feature game pay table.

18. The non-transitory computer-readable medium of claim 15, wherein the instructions, when executed, cause the gaming machine to select the feature game reel simulations such that presentation of the selected feature game reel simulations presents a number of spins specified by the selected volatility option.

19. The non-transitory computer-readable medium of claim 15, wherein a first volatility option of the plurality of volatility options specifies a larger number of spins than specified by a second volatility option of the plurality of volatility options.

20. The non-transitory computer-readable medium of claim 15, wherein the instructions, when executed, cause the gaming machine to present the selected one or more feature game reel simulations using reels carrying a number of wild symbols specified by the selected volatility option.

* * * * *